(12) United States Patent
Bean

(10) Patent No.: US 6,752,681 B1
(45) Date of Patent: Jun. 22, 2004

(54) APPARATUS WITH BELLOWS FOR CALLING GAME

(75) Inventor: Ron M. Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 0 days.

(21) Appl. No.: 10/605,051

(22) Filed: Sep. 4, 2003

Related U.S. Application Data

(60) Continuation of application No. 09/962,560, filed on Sep. 25, 2001, now Pat. No. 6,648,716, which is a division of application No. 09/326,961, filed on Jun. 7, 1999, now Pat. No. 6,328,623.

(51) Int. Cl.$^7$ .................................................. A63H 5/00

(52) U.S. Cl. .................... 446/208; 446/397; 446/193

(58) Field of Search ......................... 446/206, 207, 446/209, 180, 188, 192, 193, 197, 397; 84/402, 202, 203

(56) References Cited

U.S. PATENT DOCUMENTS

| | | | |
|---|---|---|---|
| 2,583,400 A | 1/1952 | Wade | 446/188 |
| 3,172,223 A | 3/1965 | Stager | 43/2 |
| 4,576,584 A | 3/1986 | Hill | |
| 4,940,451 A * | 7/1990 | Leady | 446/208 |
| 4,941,369 A | 7/1990 | Specht et al. | |
| 5,549,498 A | 8/1996 | Kirby | 446/193 |
| 5,577,946 A | 11/1996 | Oathout | 446/208 |
| 5,613,891 A | 3/1997 | Lamo | 446/193 |
| 5,704,154 A | 1/1998 | Galfidi, Jr. | 446/193 |
| 5,885,126 A * | 3/1999 | Carlson | 446/208 |
| 6,042,447 A | 3/2000 | Thompson | 446/193 |
| 6,106,357 A * | 8/2000 | Weiser | 446/208 |
| 6,547,627 B1 * | 4/2003 | Oathout | 446/208 |

* cited by examiner

Primary Examiner—Derris H. Banks
Assistant Examiner—Urszula M Cegielnik
(74) Attorney, Agent, or Firm—Simmons, Perrine, Albright & Ellwood, P.L.C.

(57) ABSTRACT

A game call having a bellows coupled to a reed for producing sound, together with a reed controller which is operable by contact with the bellows, thereby changing the pitch of the sound produced.

10 Claims, 2 Drawing Sheets

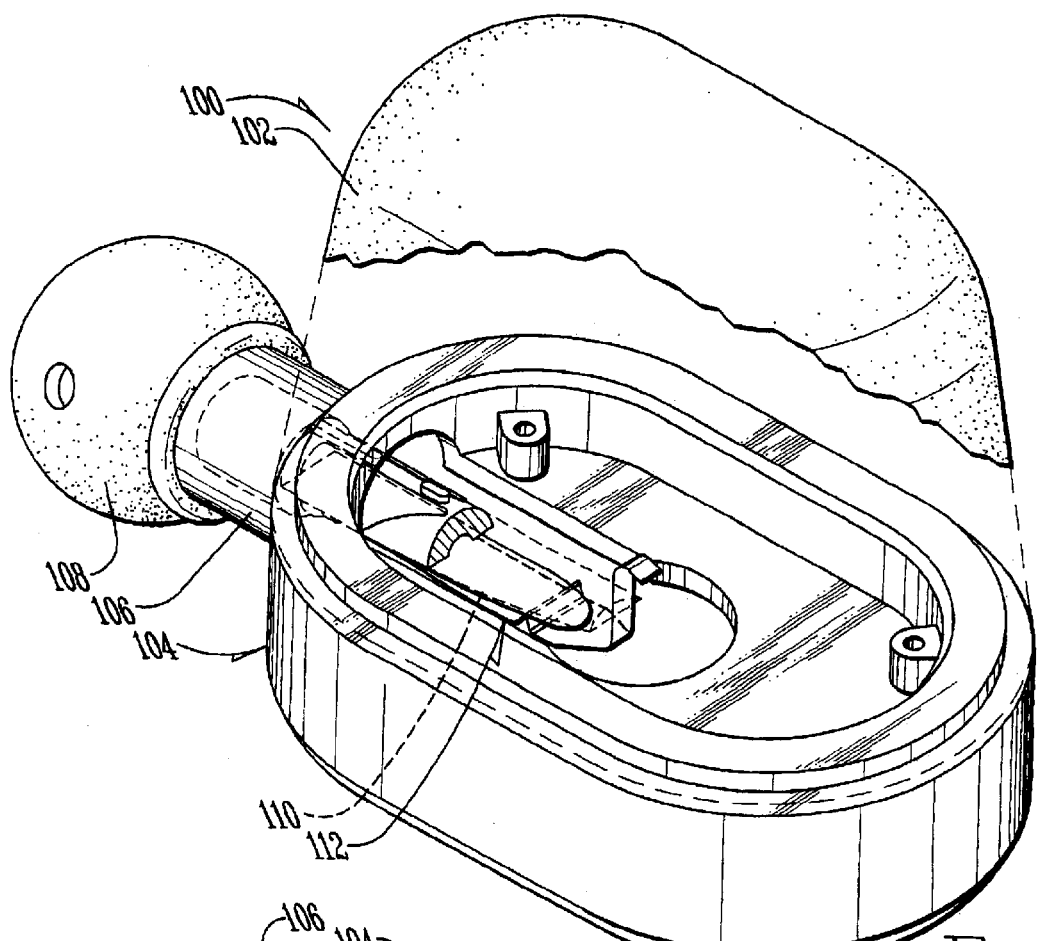
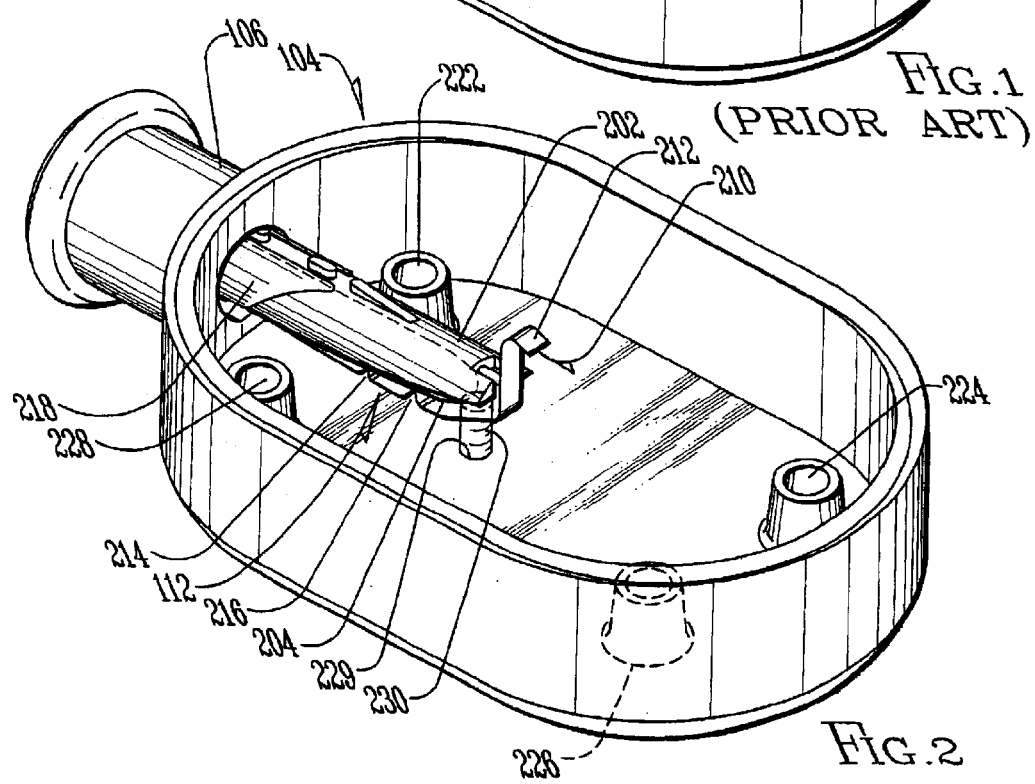

APPARATUS WITH BELLOWS FOR CALLING GAME

CROSS REFERENCE TO RELATED APPLICATIONS

This application is a continuation of application Ser. No. 09/962,560 filed on Sep. 25, 2001, now U.S. Pat. No. 6,648,716 which itself was a Divisional of application Ser. No. 09/326,961 filed Jun. 7, 1999, and issued Dec. 11, 2001 as U.S. Pat. No. 6,328,623, which patent has now been disclaimed. These applications are both incorporated herein in their entirety by this reference.

BACKGROUND OF INVENTION

In the past, hunters have used various devices to call game, such as the ubiquitous tube call, in which air is blown through a mouthpiece and over a reed to generate sound. Other calls have used a flexible bellows or bulb attached to a tube call to eliminate the need for blowing through the mouthpiece.

While these calls have many advantages, they also have significant drawbacks.

First of all, the skill required to successfully operate the tube call is often more than is possessed by inexperienced or infrequent hunters and game callers.

Secondly, moisture from the operator's breath often condenses within the tube call, which may adversely affect the sound produced by the call.

Thirdly, the calls using bellows and bulbs have often had limited operational characteristics, owing to the lessened control that a bellows often has in comparison to a mouth-blown call.

Consequently, there exists a need for improvement in game calling methods and apparatuses.

SUMMARY OF INVENTION

It is an object of the present invention to provide an easily operated game call having pitch variation capabilities.

It is a feature of the present invention to include a reed plunger for controlling pitch.

It is an advantage of the present invention to allow for manipulation of the reed plunger in an easy to use fashion.

It is another advantage of the present invention to increase the certainty that the call will produce an appropriate sound.

It is yet another advantage of the present invention to provide for tuning of the call while in the field without the need for completely dismantling the call.

The present invention is an apparatus and method for calling game which is designed to satisfy the aforementioned needs, provide the previously stated objects, include the above-listed features and achieve the already articulated advantages. The present invention is carried out in an "error-less multi-pitch" approach in a sense that the amount of errant sounds, which often are produced by multi-pitch calls, is dramatically reduced.

Accordingly, the present invention is an apparatus and method for calling game which includes a bellows and a manually operative reed plunger disposed within an air chamber coupled to the bellows, where the reed plunger provides for variation of sound produced by permitting variably controllable reed vibration states.

BRIEF DESCRIPTION OF DRAWINGS

The invention may be more fully understood by reading the following description of the preferred embodiments of the invention, in conjunction with the appended drawings wherein:

FIG. 1 is a cutaway perspective view of the call of the prior art, where the cutaway portion reveals operable portions of the call.

FIG. 2 is a perspective view of a central portion of the call of the present invention.

DETAILED DESCRIPTION

Figure 3:
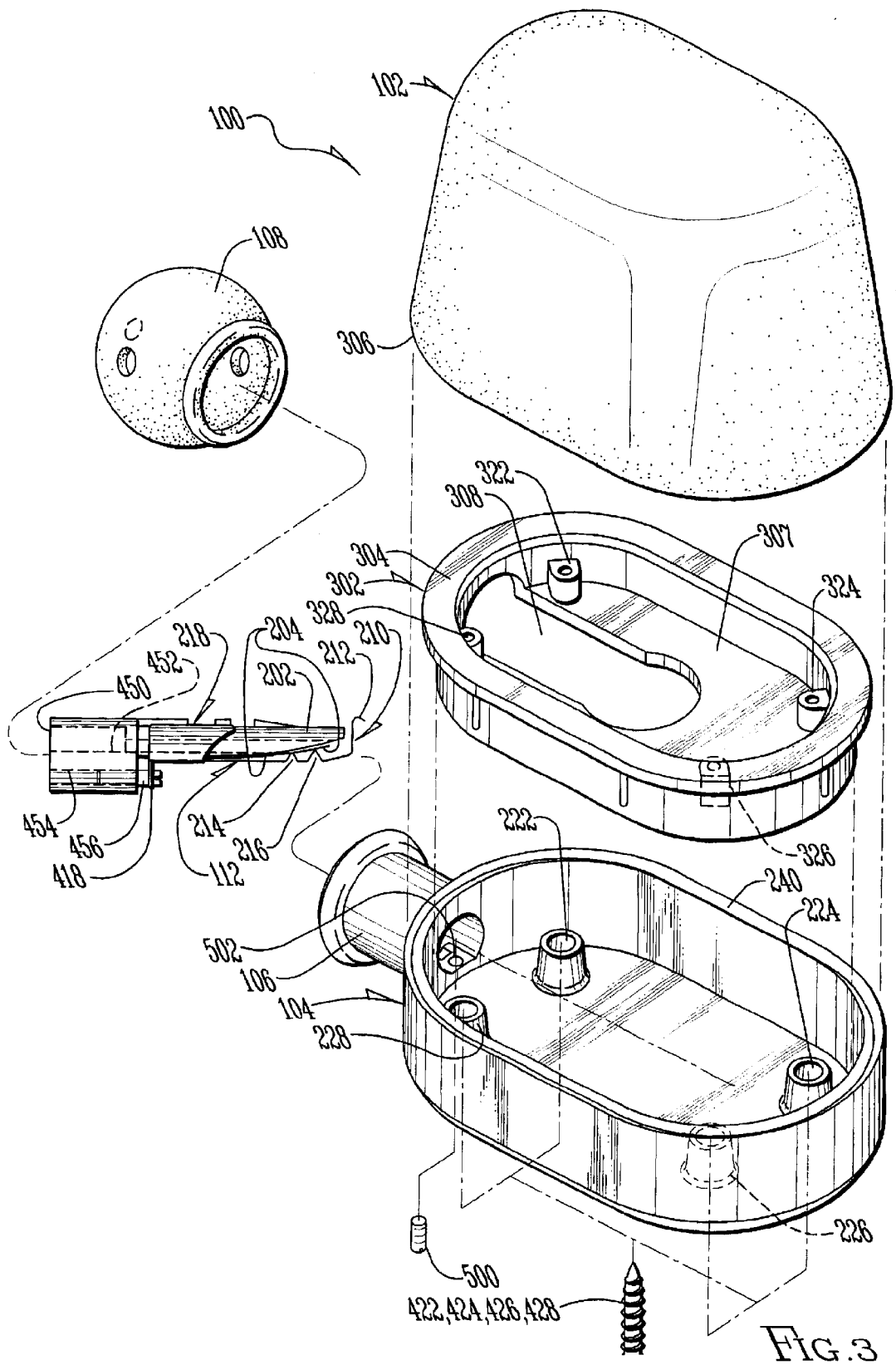
FIG. 3 is a perspective partial exploded view of a call of the present invention where the dotted lines show the orientation of objects when in an assembled state.

Now referring to the drawings, wherein like numerals refer to like matter throughout, and more particularly to FIG. 1, there is shown an apparatus of the prior art, generally designated 100, which includes a bellows 102 which may be any flexible cap or cover which is easily depressed but sufficiently resilient to return to an earlier shape when pressure is no longer being applied. Also shown is a call central section 104, which is a container capable of receiving bellows 102 and an optional throat section 106. Call central section 104 is shown having a cutaway section 110, which reveals a reed/pitch control assembly 112, therein. An optional sound chamber 108 is also shown. Optional throat section 106 may be made of the same material as call central section 104, which could be any suitable material with sufficient rigidity and strength to accomplish the function of receiving bellows 102 and retaining reed/pitch control assembly 112. Material such as plastic, composite materials, wood or metal and others all could be used. Optional sound chamber 108 can be of any suitable material, but a flexible and pliable material, such as rubber or soft plastic, similar to material used for the bellows 102, may be preferred.

Now referring to FIG. 2, there is shown a detailed view of portions of the present invention, including call central section 104 after bellows 102 has been removed. Shown disposed inside of call central section 104 is reed/pitch control assembly 112, which includes an air tube 202 and a reed 204. Air tube 202 provides a passage for air to pass therethrough and further provides structural support for reed/pitch control assembly 112. Reed 204 is a thin planar member which vibrates, producing sound when air passes over it. The combination of air tubes and reeds is a well-known means to provide sound in game calls. A reed plunger 210 is also shown having a top contact end 212 for cooperation with and activation by bellows 102 when bellows 102 is fully or near fully depressed. Reed plunger 210 may be a single piece of thin metal, such as copper or brass or any other suitable material which has sufficient rigidity to transfer force from the bellows 102, to affect the vibration parameters of reed 204 by contacting reed 204 at various points thereon. Reed plunger 210 may have one or more reed contacting detents disposed thereon. First reed contacting detent 214 and second reed contacting detent 216 are shown. It should be understood that various numbers of detents may be used. It may be preferable that no detents, or only a single detent, be used if the call is designed as an elk call. However, if the call is designed as a turkey call or other type of call, then multiple detents may be preferred. Reed plunger 210 has an air tube coupling section 218 which couples to air tube 202.

Also shown in FIG. 2 is first screw sleeve 222, second screw sleeve 224, third screw sleeve 226, and fourth screw sleeve 228. A reed plunger limiter 230 is shown disposed through limiter hole 229. Reed plunger limiter 230 may be a screw or other member which is adjustable, so as to limit the permissible deflection of reed plunger 210 to predetermined levels. These predetermined levels are set to prohibit unwanted pitches from being emitted by the call if the bellows 102 and reed plunger 210 are depressed further than is needed to produce the desired pitch. Reed plunger limiter 230 may be a set screw which is adjustable through limiter hole 229.

Now referring to FIG. 3, there is shown a partially exploded view of the call of the present invention which includes a bellows grasping member 302, which has a bellows grasping rim 304, which may be inserted inside bellows 102 and cooperate with a bellows bottom rim 306 formed around the periphery of bellows 102. Bellows grasping member 302 has an air passage hole 308 therein for permitting air from inside bellows 102 to flow to and through air tube 202. When the bellows grasping member 302 is pulled into contact with central body rim 240 by insertion of first, second, third and fourth screws 422, 424, 426 and 428, respectively into first, second, third, and fourth screw sleeves 222, 224, 226, and 228, respectively, and coupling with first, second, third, and fourth screw grasping members 322, 324, 326 and 328 respectively, preferably an air-tight seal forms between bellows 102 and call central section 104. Bellows grasping member 302 also assists in limiting the maximum stroke of the bellows 102 as it is compressed during call operation, and thereby assists in limiting the range of deflections of reed plunger 210 which are permissible. The placement of the bottom 307 of bellows grasping member 302 and its air passage hole 308 with the respect to the top of the bellows can be varied to alter the stroke characteristic of the bellows 102.

Also shown in FIG. 3 is a side view of reed/pitch control assembly 112, which shows a pitch adjustment screw-receiving flange 418 disposed on reed plunger 210. Reed plunger 210 is capable of translational motion along air tube 202 and reed 204. Translating reed plunger 210 results in different points of contact along reed 204 by detents 214 and 216 (or preferably a single detent for elk calls). This results in tuning the pitch of the call. The translation of the reed plunger 210 is accomplished by turning reed pitch adjusting screw 456, through pitch adjusting screw hole 454, so that reed pitch adjusting screw 456 cooperates and manipulates the pitch adjustment screw-receiving flange 418 of reed plunger 210. Air tube 202 has an outlet end 450 with an air outlet orifice 452 therein. Optional sound chamber 108, with its air holes therein, may be disposed over outlet end 450 of optional throat section 106. Note the throat section 106 is optional, as is the sound chamber 108, but in a preferred embodiment, both throat section 106 and sound chamber 108 may be particularly desirable. Also shown is a locking screw 500 disposed through a locking screw hole 502 in throat section 106. Locking screw 500 is for securing reed/pitch control assembly 112 into the central section when air pressure therein might otherwise cause reed/pitch control assembly 112 to be forced out of throat section 106.

In operation, the present invention accomplishes the goal of generating sounds suitable for calling game as follows: the bellows 102 is depressed a first distance, thereby creating an airflow over reed 204 and through air tube 202. This airflow causes a vibration of the reed 204. The pitch of the call is controlled by the point of contact of detent(s) with the reed 204. The point of contact is adjusted with reed pitch adjusting screw 456. The bellows 102 is further depressed, so as to engage top contact end 212 of reed plunger 210, which is caused to move, thereby flexing and causing detent 216 to no longer contact reed 204. This allows reed 204 to vibrate over a different length, thereby generating a different pitch as air passes over reed 204 and through air tube 202. If the motion of reed plunger 210 is not limited by limiter 230, then reed plunger 210 can be caused to further flex, thereby releasing detent 214 from contact with reed 204, thereby generating a sound having yet another pitch.

In operation, the call 100 can be tuned to provide various sounds for calling game. For example, if a predetermined elk sound is desired, then that sound is analyzed to understand the variations in pitch during the duration of the call. For example a call for an elk might start with a high pitched first segment and finish with a much lower pitch second segment. If screw 456 is adjusted, detent 216 can be positioned along reed 204 so that the first pitch segment emulates a first part of a well-known sound made by a cow elk and the second segment of the call is matched in frequency to a second segment of such well known sounds made by a cow elk. Additionally, if the predetermined sound has a third segment with a third pitch, then the placement of detent 214 can be matched by screw 456 or during manufacture of reed plunger 210. It is believed that for elk, one of the detents 214 or 216 can be omitted or in the alternative, both can be included but through use of limiter 230 the reed plunger 210 can be prohibited from causing detent 214 from disengaging for the reed 204. Again, for example, an elk call may have a relatively strong and noticeable second lower- pitched second segment. This is accomplished by matching the desired duration of the second segment of the call to the position of the top contact end 212 within the bellows 102. These selections of a predetermined height of top contact end 212, height of limiter 230 and/or placement of detent(s) to produce a predetermined sound desirable for calling elk are important aspects of the method of the present invention. While particular configurations of the present invention may be well suited for elk calls, it is intended that particular other configurations of the call and uses of such other configurations for game other than elk are included within the scope of the present invention.

These well-known sounds made by a cow elk and elk fawns are referred to herein as natural elk calls. While each elk may have a unique call, they have common characteristics which are well known to hunters and designers of elk calls. The tuning in the field of the present invention and the optimization of the parameters of this call during design and manufacture are often done by careful listening to the sound produced by an individual familiar with these natural elk calls. While it is possible to use sophisticated electronic sound measuring equipment, it is believed that the present invention may be readily manufactured without such equipment, if an individual who is familiar with such natural elk calls assists in the process.

It is thought that the method and apparatus of the present invention will be understood from the foregoing description and that it will be apparent that various changes may be made in the form, construct steps and arrangement of the parts and steps thereof, without departing from the spirit and scope of the invention, or sacrificing all of their material advantages. The form herein described is merely a preferred exemplary embodiment thereof.

What is claimed is:

1. An apparatus for calling game comprising:
    means for generating airflow by a compression force applied on a resilient first member in a first direction;
    means for generating sound, using a vibrating reed, in response to said airflow; and,
    depressing a plunger having a top contact end, by contact between said top contact end and said resilient first member, so that a reed-contacting member moves with respect to said reed, such that an increase in a depression distance of said top contact end results in an increase in a length of said reed which is free for sound-generating vibration; and
    means for changing a sound characteristic of said airflow by twisting a rigid second member, so as to advance, in a direction opposite said first direction, said rigid member to an advanced position, such that when said rigid second member is advanced, said top contact end is restricted from occupying a location which would be otherwise capable of being occupied, by said top contact end, had said rigid second member remained in a non-advanced position.

2. An apparatus of claim 1 further comprising:

means for providing a sound chamber over a cylindrical surface, where the cylindrical surface has an end orifice therein allowing airflow therethrough and said sound chamber has a proximal end which extends over said cylindrical surface, said sound chamber further having a distal end with a single orifice therein for allowing airflow therethrough, said sound chamber further having a pair of airflow vents on opposing sides of said sound chamber, disposed between said distal end and said proximal end.

3. An apparatus of claim 2 wherein said sound chamber is constructed of a first material which is more pliable than a second material of said cylindrical surface.

4. An apparatus of claim 3 wherein said resilient first member is retained by at least a pair of screws extending in a direction opposite said first direction.

5. A game call comprising:

a bellows, configured to be pushed in a first direction so as to cause an airflow to occur;

said bellows having a top end and a bottom end, where said bottom end has a generally oval-shaped opening;

said first direction being a direction from said top end toward said bottom end;

a body portion having an oval-shaped bellows end, said body portion having a plurality of screw-receiving holes therethrough;

a bellows retainer having an oval-shaped bellows-grasping rim and an oval-shaped lower portion sized to fit inside said oval-shaped bellows end of said body portion;

said oval-shaped bellows-grasping rim having a larger maximum circumference than a maximum circumference of said oval-shaped lower portion;

said bellows retainer having a plurality of screw-grasping holes therein;

each of said plurality of screw-grasping holes being disposed between an airflow-permitting opening in said bellows retainer and an exterior surface of said oval-shaped lower portion;

a reed disposed so as to vibrate when said airflow occurs;

said reed having a reed longitudinal dimension which is greater than a transverse width dimension;

a movable reed-contacting member which contacts said reed along a line parallel with said transverse width dimension of said reed;

said movable reed-contacting member having a contact top end ending upwardly toward said top end of said bellows;

said movable reed-contacting member being disposed so as to be movable when said contact top end is contacted by an inside surface of said bellows when said bellows is pushed in said first direction;

a rigid member, having a rigid member longitudinal axis, said rigid member extending into said body portion; said rigid member disposed so as to advance into said body portion when twisted about said rigid member longitudinal axis; and, said rigid member disposed so that when advanced inwardly into said body portion, said contact top end is restricted from being pushed to a lower position which otherwise would have been possible without an advancement of said rigid member.

6. A game call of claim 5 wherein said airflow is in a direction generally perpendicular to said first direction when said airflow exits said body portion.

7. A game call of claim 5 wherein said reed longitudinal axis is oriented in a direction generally perpendicular with respect to said first direction.

8. A game call of claim 5 wherein said reed-contacting member is oriented so that a continuous depression of said contact top end does not result in a continuous change in a permissible reed vibration length of said reed.

9. A game call of claim 5 wherein said rigid member has a top exterior surface which contacts a bottom side of said reed-contacting member.

10. A game call comprising:

a bellows, configured to be pushed in a first direction so as to cause an airflow to occur;

said bellows having a top end and a bottom end, where said bottom end has a generally oval-shaped opening;

said first direction being a direction from said top end toward said bottom end;

a body portion, having an oval-shaped bellows end, said body portion having a plurality of screw-receiving holes therethrough;

a bellows retainer having an oval-shaped bellows-grasping rim and an oval-shaped lower portion sized to fit inside said oval-shaped bellows end of said body portion;

said oval-shaped bellows-grasping rim having a larger maximum circumference than a maximum circumference of said oval-shaped lower portion;

said bellows retainer having four screw-grasping holes therein;

each of said four screw-grasping holes being disposed between an elongated airflow-permitting opening in said bellows retainer and an exterior surface of said oval-shaped lower portion;

a reed disposed within said body portion so as to vibrate when said airflow occurs;

said reed having a reed longitudinal dimension which is perpendicular to said first direction and greater than a transverse width dimension of said reed;

a flexibly movable reed-contacting member which contacts said reed along a line parallel with said transverse width dimension of said reed;

said flexibly movable reed-contacting member having a contact top end ending upwardly toward said top end of said bellows in a direction generally perpendicular to said reed longitudinal axis;

said flexibly movable reed-contacting member being disposed so as to be flexibly movable when said contact top end is contacted by an inside surface of said bellows when said bellows is pushed in said first direction;

said flexibly movable reed-contacting member having two detents which define discrete permissible vibration lengths of said reed;

a rigid screw member, having a rigid screw member longitudinal axis which is perpendicular to said reed longitudinal axis, said rigid screw member extending into said body portion; said rigid screw member disposed so as to advance into said body portion when twisted about said rigid member longitudinal axis; and, said rigid screw member disposed so that when advanced inwardly into said body portion, a bottom side of said flexibly movable reed-contacting member contacts an exterior end of said rigid screw member so as to limit depression of said flexibly movable reed-contacting member.

* * * * *